US009131117B2

(12) United States Patent
Luss

(10) Patent No.: US 9,131,117 B2
(45) Date of Patent: Sep. 8, 2015

(54) OPTIMAL CONTENT DISTRIBUTION IN VIDEO-ON-DEMAND TREE NETWORKS

(75) Inventor: Hanan Luss, Marlboro, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 1617 days.

(21) Appl. No.: 11/522,754

(22) Filed: Sep. 18, 2006

(65) Prior Publication Data

US 2008/0071894 A1 Mar. 20, 2008

(51) Int. Cl.
G06F 15/173 (2006.01)
H04N 7/173 (2011.01)
H04N 7/16 (2011.01)
H04N 21/218 (2011.01)
H04N 21/2312 (2011.01)
H04N 21/258 (2011.01)
H04N 21/472 (2011.01)
H04L 29/08 (2006.01)
H04L 29/06 (2006.01)

(52) U.S. Cl.
CPC ............ *H04N 7/17336* (2013.01); *H04L 67/16* (2013.01); *H04N 21/2181* (2013.01); *H04N 21/2312* (2013.01); *H04N 21/25841* (2013.01); *H04N 21/47202* (2013.01); *H04L 65/4076* (2013.01)

(58) Field of Classification Search
CPC .................. H04N 71/17336; H04N 21/2181; H04N 21/2312; H04N 21/25841; H04N 21/47202; H04L 65/4076; H04L 67/16
USPC .......... 709/223–226; 725/86, 87, 91, 95, 101, 725/105, 135
See application file for complete search history.

(56) References Cited

U.S. PATENT DOCUMENTS

| 6,088,689 | A  | * | 7/2000  | Kohn et al. ...................... 706/10 |
| 7,035,802 | B1 | * | 4/2006  | Rigazio et al. ................ 704/256 |
| 7,082,401 | B2 |   | 7/2006  | Behrens et al. ............... 379/201 |
| 2004/0031058 | A1 | * | 2/2004 | Reisman ........................ 725/112 |
| 2005/0262246 | A1 | * | 11/2005 | Menon et al. ................. 709/226 |

OTHER PUBLICATIONS

G. Dammicco, U. Mocci, and F. U. Bordoni, "Optimal Server Location in VOD Networks", Global Telecommunications Conference (GLOBECOM) 1997, IEEE 1, 197-201, Nov. 3-8, 1997.
T. Bektas, O. Oguz, and I. Ouveysi, "Designing Cost-Effective Content Distribution Networks", Computers and Operations Research, article in press, expected to appear in 2007 (available online, Oct. 13, 2005).

* cited by examiner

Primary Examiner — Tonia L.M. Dollinger
Assistant Examiner — Clarence John

(57) ABSTRACT

A method provides for the optimal location of servers and the optimal assignment of programs to the servers in a video-on-demand (VOD) network with a tree topology. Each node may have demands for multiple VOD programs. The central server at the root of the network stores all programs, and each of the other servers may store some of these programs. The cost considered include cost of servers, cost of assigning programs to servers, and cost of link bandwidths used for broadcasting programs from servers to demands at various nodes. The demand for a specific program is served by the closest server that has this program along the path that connects the requesting node to the root of the tree network. The invention consists of a dynamic programming method that determines optimal server locations and optimal program assignments for minimizing the costs. Starting from the end-nodes of the tree network, the method determines optimal solutions to subtrees, eventually reaching the root node, thus providing an optimal solution to the entire network.

10 Claims, 2 Drawing Sheets

OPTIMAL CONTENT DISTRIBUTION IN VIDEO-ON-DEMAND TREE NETWORKS

FIELD OF THE INVENTION

The present invention relates to Video-on-Demand (VOD) networks. Specifically, the invention relates to content distribution in video-on-demand networks and more specifically, the invention concerns location of servers and assignment of programs to servers in networks with tree topology.

BACKGROUND OF THE INVENTION

Many telecommunications network services providers and cable TV operators are showing significant interest in provisioning Video-on-Demand (VOD) services. These services are expected to grow significantly over time. Primary application areas include on-demand home entertainment, distance learning and training, and news-on-demand. These services require significant capital investments. In one extreme network configuration, a central server would broadcast all programs to all demand nodes, imposing very large bandwidth requirements on numerous links. In another extreme, a server would be installed at every node and all programs that might be requested would be stored at the node. The latter configuration would require a large number of servers and would incur large storage and processing costs.

The present invention considers a flexible configuration in which servers can be located in a subset of the nodes and a subset of the programs is assigned to each of the servers. In practice, the programs are aggregated into program families, where a program family includes multiple programs with the same characteristics. For example, children's movies may be represented by one family, action movies by another, etc. As used hereinbelow, a program family is referred to as a program.

Various related problems have been explored. A. Balakrishnan, T. L. Magnanti, and R. T. Wong, "A Decomposition Algorithm for Local Access Telecommunications Network Expansion Planning", *Operations Research*, 43, 58-76, 1995, B. Li, M. J. Golin, G. F. Italiano, and X. Deng, "On the Optimal Placement of Web Proxies in the Internet", *Proceedings of IEEE INFOCOM 1999 Conference*, V. 3, 1282-1290, 1999, O. E. Flippo, A. W. J. Kolen, A. M. C. A. Koster, and R. L. M. J. Van de Leensel, "A Dynamic Programming Algorithm for the Local Access Telecommunication Network Expansion Problem", *European Journal of Operational Research*, 127, 189-202, 2000, T. Carpenter, M. Eiger, P. Seymour, and D. Shallcross, "Node Placement and Sizing for Copper Broadband Access Networks", *Annals of Operations Research*, 106, 199-228, 2001, I. Cidon, S. Kutten, and R. Soffer, "Optimal Allocation of Electronic Content", *Computer Networks* 40, 205-218, 2002, and C. A. Behrens, T. Carpenter, M. Eiger, H. Luss, G. Seymour, and P. Seymour, "Digital Subscriber Line Network Deployment Method", U.S. Pat. No. 7,082,401, issued Jul. 25, 2006 present models and variations of dynamic programming algorithms for placing concentrators in traditional access networks and for placing equipment for diverse broadband services. Such equipment may include Digital Subscriber Line (DSL) Access Multiplexers for DSL services, Optical Network Units in Fiber-to-the-Curb networks and in cable networks, web proxies, etc. The algorithms presented in these references can be used to solve a special case of the present invention in which all programs are assigned to all servers. G. Dammicco, U. Mocci, and F. U. Bordoni, "Optimal Server Location in VOD Networks", *Global Telecommunications Conference* (*GLOBECOM*) 1997, IEEE 1, 197-201, 3-8 Nov., 1997 present a simple model for server locations and program assignments in VOD tree networks. Their model partitions the tree nodes into levels where all nodes of the same level are equally far from node 0 in terms of number of hops. The model finds the optimal level where servers should be installed and the optimal subset of programs that should be assigned to servers at that level. The model is restrictive as all nodes at the selected level would have a server and the same subset of programs. T. Bektas, O. Oguz, and I. Ouveysi, "Designing Cost-Effective Content Distribution Networks", *Computers and Operations Research*, article in press, expected to appear in 2007 (available online, 13 Oct. 2005) discuss a content distribution model for a logical tree network, where servers are directly connected to the central server and each of the demand nodes is directly connected to one of the servers. The resulting network configuration is limited to trees with a depth of two hops from the root node to the demand nodes.

The present invention uses a dynamic programming optimization method to determine optimal location of servers throughout a network with a general tree topology and optimal assignment of programs to each of these servers. Current state-of-the-art systems use ad-hoc heuristics and communications network managers' experience to design such flexible network configurations.

SUMMARY OF THE INVENTION

The present invention provides a method for content distribution in video-on-demand (VOD) networks with a tree topology. Consider a tree network with a server at the root node that stores P program families, referred to as programs. Each node in the network has demands for a subset of the P programs. Although the server at the root node can broadcast the P different VOD programs throughout the tree network, the resulting required bandwidth on the network links would be very large. In the other extreme, a server would be installed at every node of the network and all programs that might be requested would be stored at the node. The latter configuration would require a large number of servers and would incur large storage and processing costs. A more effective configuration is to install servers at a selected subset of nodes of the network and store a subset of the programs at each of these nodes. Accordingly, the present invention determines optimal server locations and optimal assignment of programs to each of these servers. The invention considers cost of servers, cost of assigning programs to servers, and cost of link bandwidths used for broadcasting programs. A dynamic programming optimization method is used to determine the optimal server location and program assignment decisions.

The present invention will be more clearly understood when the following description is read in conjunction with the accompanying drawings.

DETAILED DESCRIPTION

Figure 1:
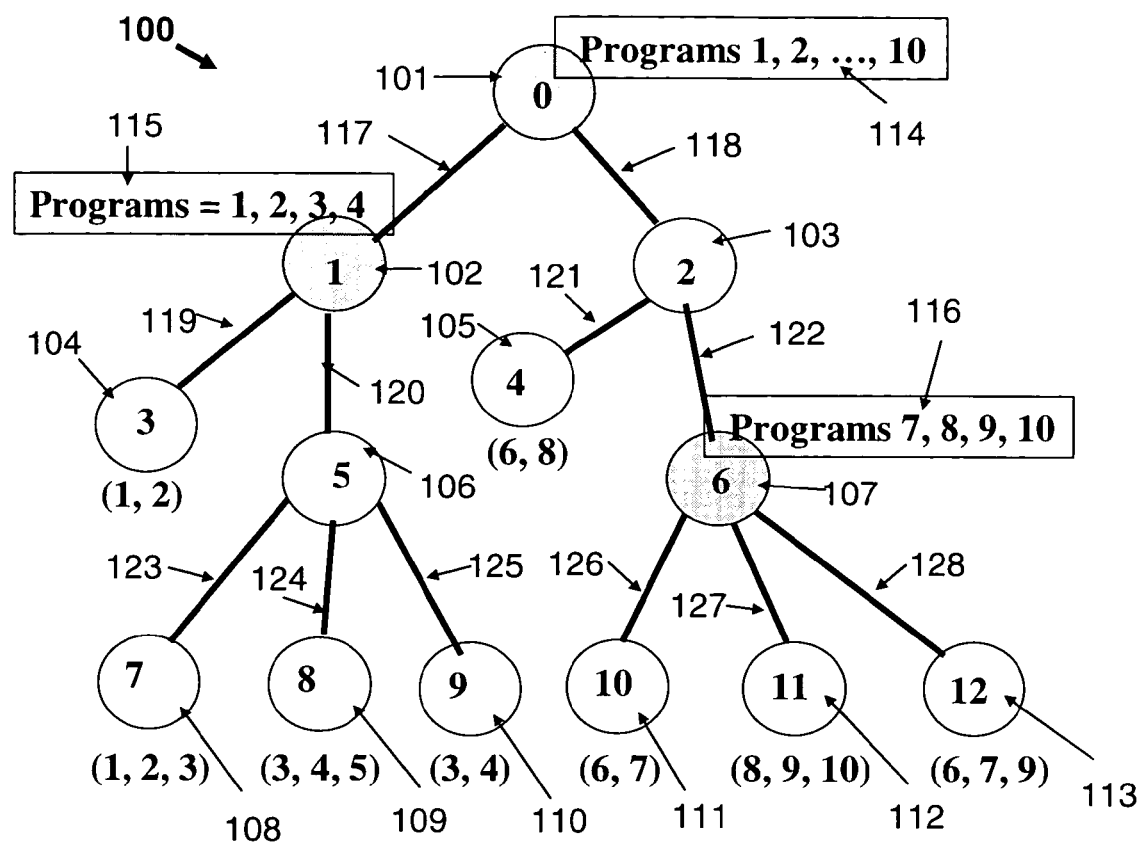
FIG. 1 is a graphical representation of the content distribution problem for a VOD tree network.

Referring now to the figures and to FIG. 1 in particular, there is shown an example of a VOD tree network 100. The network includes thirteen nodes 101-1 13. Node 101 (also labeled as node 0) is the root node. The nodes are interconnected by links 117-128. Node 101 has the central VOD server. The central VOD server stores all the programs, labeled as p=1, 2, . . . , P, where in the present example P=10. Below each node, in parentheses, are specified the programs requested at that node, for instance, node 105, also labeled as node 4, has demand for programs 6 and 8, and node 108, also labeled as node 7, has demand for programs 1, 2 and 3. In this example, nodes 101, 102, 103, 106 and 107 have no requested demands. In this example, in addition to the server at node 101, servers are also installed at nodes 102 and 107 (the shaded nodes, also labeled as nodes 1 and 6). Boxes 114-116 represent the programs stored in each respective server. The server at node 102 stores and broadcasts programs specified in 115, namely, programs 1, 2, 3 and 4, and the server at node 107 stores and broadcasts programs specified in 116, namely, programs 7, 8, 9 and 10. All the demands at nodes 104, 108, 109, 110 are served by the server at node 102, except for demand 5 at node 109. Similarly, the server at node 107 serves demands 7 at node 111, demands 8, 9 and 10 at node 112, and demands 7 and 9 at node 113. The central server at node 101 stores all 10 programs in 114 but broadcasts only some of them. It broadcasts demand 5 to node 109, demands 6 and 8 to node 105, and demand 6 to nodes 111 and 113. The central server at node 101 also routes programs 1-4 to the server at node 102 and programs 7-10 to the server at node 107. The routing cost of a program from the central server at node 101 to other servers is negligible as it occurs only once.

The input to the proposed method includes the network topology, the requested demands at each of the nodes in the network, and cost parameters. The cost parameters considered include a cost for installing a server, a cost for assigning a program to a server, and bandwidth costs incurred on the links. The link costs are incurred for broadcasting programs from a server to the appropriate demands at various nodes.

This invention provides a method for the Content Distribution (CONDIS) Model that formulates the server location and program assignment problem as an optimization problem.

Consider a tree network with nodes n=0, 1, . . . , N, where node 0 is the root of the tree and the number of nodes in the tree is N+1. The nodes are labeled so that a node that is farther away (in number of hops) from the root has a higher label than any node that is closer to the root; see FIG. 1. Index j is also used as an index for nodes. The links of the tree are indexed by l (and sometimes by j or n), and the link label is the same as the label of its end-node that is farther from the root. For example, link 6 in FIG. 1 (labeled as 122) is the link that connects nodes 2 and 6 (103 and 107). Let p be the index for programs, p=1, 2, . . . , P, where P is the number of available VOD programs.

The following set notation is used in our formulation:

$I_n$=Set of programs p requested at node n.

$QL(j, n)$=Set of links on the path that connect nodes j and n (j<n).

$QN(j, n)$=Set of nodes (including the end-nodes) on the path that connects nodes j and n (j≤n).

Thus, for example, in FIG. 1, $I_1 = \emptyset$ and $I_{12} = \{6, 7, 9\}$, QL(0, 12)={2, 6, 12}, QN(0, 12)={0, 2, 6, 12}, and QN(12, 12)={12}.

Cost parameters included in the model:

$c_{lp}$=Cost of bandwidth on link l required for broadcasting program p on link l to reach some demand nodes.

$S_j$=Fixed cost of installing a server at node j.

$s_{jp}$=Cost of assigning program p to a server at node j. This cost includes storage and control cost of program p at node j.

As already mentioned, the cost of routing a program from the central server at the root to any other server is negligible.

The decision variables:

$z_j$=0-1 decision variables $z_j$=1 if a server is installed at node j, and 0 otherwise.

$y_{jp}$=0-1 decision variables $y_{jp}$=1 if program p is assigned to a server at node j, and 0 otherwise.

$u_{jnp}$=0-1 decision variables. $u_{jnp}$=1 if a server at node j is the broadcasting server of program p to node n, where node n has demand for program p, and 0 otherwise.

$v_{lp}$=0-1 decision variables. $v_{lp}$=1 if program p is broadcast on link l to at least one node, and 0 otherwise.

It is assumed that the demand for program p at node n must be served by a server at a node j ∈ QN(0, n). Thus, in FIG. 1, program 8 at node 4 can only be served by the server at node 0; it cannot be served by the server at node 6. Although this assumption can be relaxed so that program p at node n can also be served by a server that has program p and is not in QN(0, n), the resulting solutions would be impractical for VOD applications. It is also assumed that the parameters $c_{lp}$>0, which implies that program p at node n will be served by the closest server to n in QN(0, n) that carries program p.

The Content Distribution Model is formulated below:

The CONDIS Model $$W^* = \min\left[\sum_{j=0}^{N} S_j z_j + \sum_{j=0}^{N}\sum_{p=1}^{P} s_{jp} y_{jp} + \sum_{l=1}^{N}\sum_{p=1}^{P} c_{lp} v_{lp}\right] \quad (1.1)$$

so that $$\sum_{j \in QN(0,n)} u_{jnp} = 1, \text{ for all } p \in I_n, n = 0, 1, \ldots, N \quad (1.2)$$

$$y_{jp} \le z_j, \, j = 0, 1, \ldots, N \text{ and } p = 1, 2, \ldots, P \quad (1.3)$$

$$u_{jnp} \le y_{jp}, \text{ for all } p \in I_n, j \in QN(0, n), \text{ and } n = 0, 1, \ldots, N \quad (1.4)$$

$$v_{lp} \ge u_{jnp}, \text{ for all } p \in I_n, l \in QL(j, n), \quad (1.5)$$
$$j \in QN(0, n) \setminus n, \text{ and } n = 1, 2, \ldots, N$$

$$z_j = 0, 1 \text{ and } z_0 = 1, \quad j = 1, 2, \ldots, N \quad (1.6)$$

$$y_{jp} = 0, 1 \text{ and } y_{0p} = 1, \quad j = 1, \ldots, N \text{ and } p = 1, 2, \ldots, P \quad (1.7)$$

$$u_{jnp} = 0, 1, \text{ for all } p \in I_n, j \in QN(0, n), \text{ and } n = 0, 1, \ldots, N \quad (1.8)$$

$$v_{lp} = 0, 1, \quad l = 1, 2, \ldots, N \text{ and } p = 1, 2, \ldots, P. \quad (1.9)$$

Objective (1.1) minimizes the sum of costs of installed servers, costs of assigned programs, and costs of link bandwidths required for broadcasting. Constraints (1.2) ensure that all demands at a node are served, where the server is along the path that connects the node to the root. Constraints (1.3) specify that programs can be assigned only to locations with a server. Constraints (1.4) specify that demand for program p at node n can be served by node j only if node j has a server with program p. Constraints (1.5) are needed to compute the link costs (QN(0, n)\n means all nodes on the path that connects nodes 0 and n, including node 0 but not node n). Constraints (1.6)-(1.9) specify the 0-1 variables. The CONDIS Model, as formulated by (1.1)-(1.9), is a large integer program even for small VOD problems. Hence, using general-purpose integer programming solvers is not practical.

This invention provides a Dynamic Programming Method for solving the CONDIS Model (referred to as DPM-CON- DIS). Consider tree $T_j$ constructed from the tree network with node j as its root and all its descendants. For example, in FIG. 1, $T_0$ consists of the entire access network with nodes 0-12 and node 0 serving as the root, and $T_2$ consists of nodes 2, 4, 6, 10, 11 and 12 with node 2 serving as the root. For each node, P state variables are defined, one for each program p. Let $x_j=(x_{j1}, \ldots, x_{jp}, \ldots, x_{jP})$ be the vector of the P state variables at node j. State variable $x_{jp}$ may take on three values: 0, 1, and 2. Specifically, $x_{jp}=0$ means that program p is not assigned to node j ($y_{jp}=0$) and program p is not broadcast into node j ($v_{jp}=0$). (Recall that link j has node j as its end-node.)

$x_{jp}=1$ means that program p is assigned to node j ($y_{jp}=1$). This also implies that a server is installed at node j ($z_j=1$).

$x_{jp}=2$ means that program p is not assigned to node j ($y_{jp}=0$), but it is broadcast into node j from a server at some node QN(0, j)\j ($v_{jp}=1$).

Since program p requested at node n would be served by the closest server to node n that has program p, the $x_j$'s imply unique values for all decision variables in the CONDIS Model. Hence, optimal vectors $x_j$ for j=0, 1, . . . , N provide optimal values for the decision variables in the CONDIS Model.

The costs at node j include the cost of installing a server at node j, the costs of assigning programs to node j and the costs for bandwidths on the incoming link into node j (i.e., link j) required for broadcasting programs to node j. Thus, the costs can be readily computed as a function of $x_j$. Let $\delta_j(x_j)=1$ if $x_{jp}=1$ for at least one p, and 0 otherwise; and let $C_j(x_j)$ be the cost of node j. Then, $$C_j(x_j) = \delta_j(x_j)S_j + \sum_{p:x_{jp}=1} s_{jp} + \sum_{p:x_{jp}=2} c_{jp}. \quad (2)$$

Consider tree $T_j$. If program p is requested at node j, i.e., if p $\in I_j$, then $x_{jp}\neq 0$ in any feasible solution. On the other hand, if none of the nodes in $T_j$ requests program p, then $x_{jp}=0$ in an optimal solution. Let SUC(j) be the set of all successor nodes of j in tree $T_j$. Then $x_{jp}=0$ implies that $x_{np}\neq 2$ for all n $\in$ SUC(j) in any feasible solution since the incoming links into these nodes will not carry program p. These observations decrease the number of relevant state variable values. Consider, for example, tree $T_9$ in FIG. 1, which consists of a single node, i.e., node 9. From the above discussion, $x_{93}$ and $x_{94}$ must not be 0 whereas all other $x_{9p}$'s should be 0. Consider now tree $T_5$, and suppose $x_{53}=0$. Then, $x_{93}=1$ since node 9 requests program 3 and program 3 cannot be carried on the incoming link into node 9. If $x_{53}=1$ or 2, then $x_{93}=1$ or 2. $X_{93}=1$ implies that node 9 would have a server with program 3. $X_{93}=2$ implies that node 9 receives program 3 from the closet server to node 9 that stores program 3 along the path that connects nodes 0 and 9 (excluding node 9).

The dynamic programming method DPM-CONDIS finds optimal cost of trees $T_N, T_{N-1}, \ldots, T_0$, with the relevant values for state variables at each node. The optimal solution is then provided by the solution of $T_0$, with $x_0=(1, 1, \ldots, 1)$. Let $V_j(x_j)$ be the optimal cost of tree $T_j$, given that the state of node j is $x_j$. For the network in FIG. 1, the method starts by finding optimal solutions for tree $T_{12}$. Note that the relevant state variable values are $x_{12,p}=0$ for all p except for p=6, 7, 9, and $x_{12,p}=1$ or 2 for p=6, 7, 9. Once all $V_j(x_j)$'s for all end-nodes j=12, 11, . . . , 7 are computed, the method proceeds to node 6 and computes $V_6(x_6)$ for each relevant $x_6$. The latter includes the cost $C_6(x_6)$ at note 6 plus the optimal cost of trees $T_{10}, T_{11}$ and $T_{12}$ for the specified $x_6$. Suppose $x_{66}=0$ and $x_{67}=1$. Then, at node 10 (the root of tree $T_{10}$) a server must be installed with at least program 6. There is a choice of assigning program 7 to the server at node 10 ($x_{10,7}=1$) or receiving program 7 from the server at node 6 ($x_{10,7}=2$). Thus, the optimal values of state variable $x_{10,p}$ (or, equivalently, the optimal decisions at node 10) depend on the state variable vector $x_6$ and on the set of feasible values at node 10. After computing all relevant values $V_6(x_6)$, optimal values for trees $T_5, T_4$ and $T_3$ are computed. Next, the method continues with trees $T_2$ and $T_1$, and finally with tree $T_0$. The optimal decisions are then readily retrieved from the optimal solutions at each node through standard backtracking.

The dynamic programming equations DPE-CONDIS are formulated below. Indices j and n are used to represent nodes, where node n is a successor of node j. Thus, tree $T_n$ is a successor tree of tree $T_j$. For example, in FIG. 1, nodes 6 and 4 are successors of node 2, and $T_6$ and $T_4$ are successor trees of tree $T_2$. Let $FEAS_j$ be the set of feasible values of $x_j$ that are potentially optimal. As explained before, the values of $x_j \in FEAS_j$ depend on the programs requested at node j and on the programs not requested at any of the nodes in $T_j$. Let $FEAS_n(x_j)$ the set of feasible values of $x_n$ that are potentially optimal, given $x_j$. The feasible values of $x_n \in FEAS_n(x_j)$ depend on the programs requested at node n, on the programs not requested at any of the nodes in $T_n$, and on $x_j$. For example, the set $FEAS_{12}$ includes $x_{12,p}=0$ for p≠6, 7, 9 and $x_{12,p}=1$ or 2 for p=6, 7, 9. However, some of these values may not be included in $FEAS_{12}(x_6)$. For example, if $x_{6,p}=0$ for p=6, 7, 9, then $x_{12,p}=1$ for these programs.

The dynamic programming equations are as follows:
DPE-CONDIS

---

BEGIN $$V_j(x_j) = C_j(x_j) + \sum_{n \in SUC(j)} [\min_{x_n \in FEAS_n(x_j)} V_n(x_n)], \quad x_j \in FEAS_j, j = N, N-1, \ldots, 0, \quad (3)$$

where $FEAS_0 = \{x_0 = (1, 1, \ldots, 1)\}$.
END.

---

If node j is an end-node (nodes 3, 4, 7-12 in FIG. 1), the summation term in (3) is equal to zero. Let $x^*_n(x_j)$ be the optimal value of $x_n$, (as determined by (3)) for each n $\in$ SUC(j) for a specified vector $x_j$ (we use superscript * to denote optimal values). The dynamic programming method for CONDIS is specified below.
DPM-CONDIS

---

BEGIN
For j = N, N-1, ..., 0,
    For all $x_j \in FEAS_j$,
        Compute $C_j(x_j)$ using equation (2);
        If SUC(j) ≠ ∅, determine $FEAS_n(x_j)$ for each n $\in$ SUC(j);

-continued

```
        Compute V_j(x_j) using DPE-CONDIS;
        If SUC(j) ≠ Ø, record x_n*(x_j) for each n ∈ SUC(j).
    End.
End.
Set x_0* = (1, 1,...,1). z_0* = 1 and y_{0p}* = 1 for p = 1, 2, ..., P.
For n = 1, 2, ..., N,
    Backtrack the optimal state variable values x_{np}*(x_j*), where j is
    the predecessor node of node n;
    Determine optimal decision variable values:
        z_n* = 1 if x_{np}*(x_j*) = 1 for some p, otherwise z_n* = 0;
        y_{np}* = 1 if x_{np}*(x_j*) = 1, otherwise y_{np}* = 0, for p = 1, 2, ..., P;
        v_{np}* = 1 if x_{np}*(x_j*) = 2, otherwise v_{np}* = 0, for p = 1, 2, ..., P;
        u_{jnp}* = 1 for largest index j ∈ QN(0, n) for which
             y_{jp}* = 1 and p ∈ I_n, otherwise u_{jnp}* = 0.
End.
END.
```

Objective function (1.1) in the CONDIS Model has a single cost parameter for assigning program p to a server at node j, namely, $s_{jp}$. This is quite appropriate for nodes $1, 2, \ldots, N$. At the root of the tree (node 0) all the P programs are stored, since node 0 supplies these programs to all other servers. Cost $s_{0p}$ may be partitioned into two components: $s1_{0p}$ and $s2_{0p}$. $s1_{0p}$ is the cost of storing program p at node 0 and supplying it to other servers (this happens only once), and $s2_{0p}$ is the cost of broadcasting program p to other nodes; $s1_{0p}+s2_{0p}=s_{0p}$. State variable $x_{0p}$ may then assume two values where, for instance, $x_{0p}=0$ would represent storing program p at a cost of $s1_{0p}$ without broadcasting, and $x_{0p}=1$ would represent storing and broadcasting program p at a cost of $s1_{0p}+s2_{0p}$. The optimal cost $V_0(x_0)$ would then be computed for all relevant values of $x_0$ and the minimum among these costs is selected as the optimal solution. Note that in the CONDIS Model $y_{0p}$ would then be redefined to $y_{0p}=0$ if program p is stored at node 0, but not used for broadcasting, and $y_{0p}=1$ if program p is stored and used for broadcasting at node 0. The term $s_{0p}y_{0p}$ in objective function (1.1) would be replaced by $s1_{0p}+s2_{0p}y_{0p}$.

DPM-CONDIS can be extended to handle more flexible assignments which do not limit program p at node n to be served by a server at some node j ∈ QN(0, n). However, this would require a significant increase in the possible values of state variables at each node n, as each possible (j, n) combination for each p that needs to be served at node n would have to be explicitly considered. DPE-CONDIS and DPM-CONDIS would have to be revised and the computational effort would significantly increase.

Figure 2:
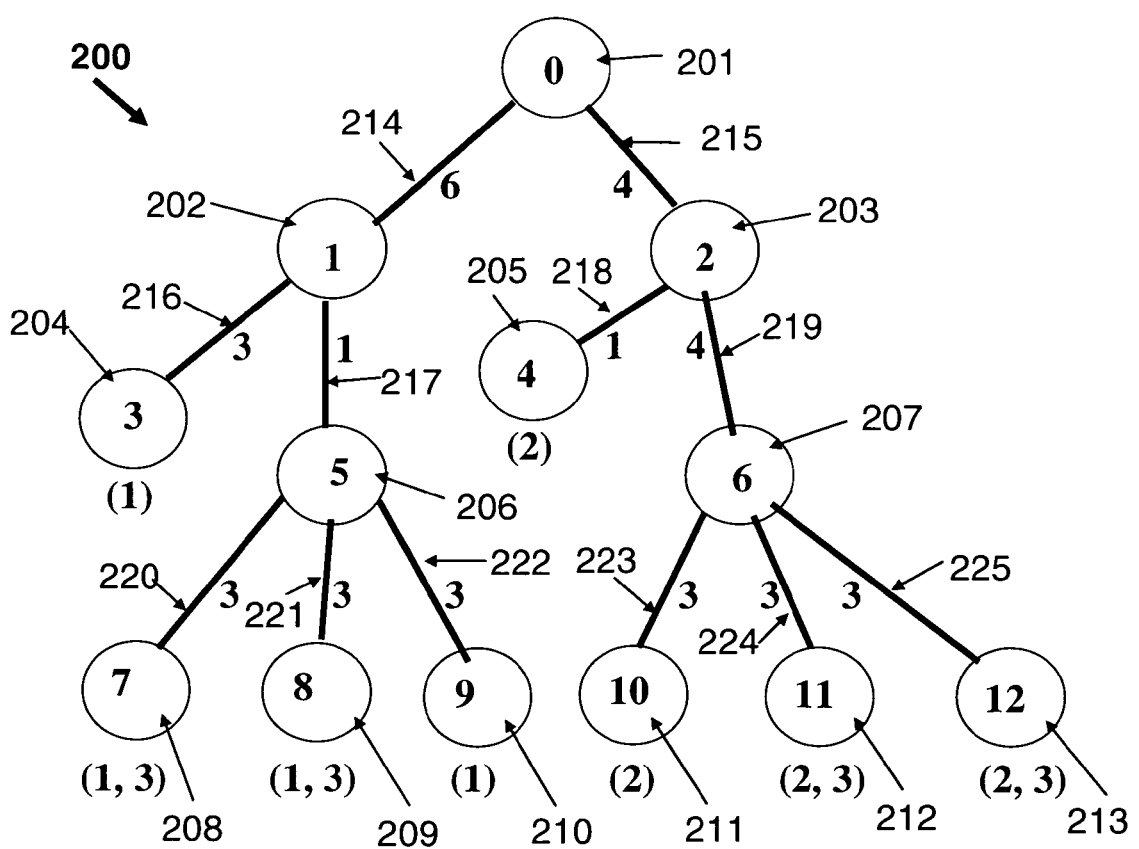
FIG. 2 illustrates input for an example of the content distribution problem solved for illustration purposes.

DPM-CONDIS is now illustrated by means of an example shown in FIG. 2. Referring now to FIG. 2, there is shown an example of a tree network 200. The network includes thirteen nodes 201-213. Node 201 is the root node (also labeled as node 0). The nodes are interconnected by links 214-225. For example, link 219 connects nodes 203 and 207 (nodes 2 and 6). Recall that in the CONDIS Model a link is labeled by the end-node farther away from the root; for example, the link that connects nodes 2 and 6 is referred to as link 6. The number of programs to be broadcast is P=3. Below each node are specified the programs requested at that node, for instance, node 205, also labeled as node 4, has demand for programs 2, and node 208, also labeled as node 7, has demand for programs 1 and 3. In this example, nodes 201, 202, 203, 206 and 207 have no requested demands. Node 201 has the central VOD server. The cost of a server at node j is $S_j=6$ for all j. The cost for assigning program p to a server at node j is $s_{jp}=2$ for all j and p. Note that the central VOD server will be installed at node 201 with all three programs available for broadcasting, i.e., $x_0=(1, 1, 1)$ is enforced. The parameters on the links are the bandwidth cost for broadcasting one of the programs on that link. Thus, for example, $c_{7p}=3$ for p=1, 2, 3, and $c_{5p}=1$ for p=1,2, 3, where link 7 is 220 and link 5 is 217.

The results obtained by DPM-CONDIS for this example are now presented. DPM-CONDIS starts with node 12. Table 1 presents the results. The left column has the feasible state variable values, and the right column has the corresponding cost $V_{12}(x_{12})$. Node 12 has only four feasible values of $x_j$ since $x_{12,1}=0$ (no demand for p=1) and $x_{12,2}$ and $x_{12,3}$ should be 1 or 2. Note that for end-nodes $V_j(x_j)=C_j(x_j)$. Thus, for example, for $x_{12}=(0, 1, 2)$ the cost includes 6 for installing a server, 2 for assigning program 2 to the server, and 3 for broadcasting program 3 on link 12 into node 12, resulting in a total cost of 11.

TABLE 1

Computation of Costs for Node 12

| $FEAS_{12}$ | $V_{12}(x_{12})$ |
|---|---|
| (0, 1, 1) | 6 + 2 + 2 = 10 |
| (0, 1, 2) | 6 + 2 + 3 = 11 |
| (0, 2, 1) | 6 + 3 + 2 = 11 |
| (0, 2, 2) | 3 + 3 = 6 |

The computations continue with nodes 11, then with node 10, and finally with node 0. The optimal costs $V_j(x_j)$ for all other end-nodes 3, 4, 7, 8, 9, 10, 11 are simply $V_j(x_j)=C_j(x_j)$. For example, for node 11, $FEAS_{11}=FEAS_{12}$ and the optimal costs $V_{11}(x_{11})=V_{12}(x_{12})$ for $x_{11}=x_{12}$. As another example, for node 10, $FEAS_{10}=\{(0, 1, 0), (0, 2, 0)\}$ with optimal costs $V_{10}(0, 1, 0)=6+2=8$ and $V_{10}(0, 2, 0)=3$.

Table 2 presents the optimal cost $V_6(x_6)$ for all $x_6 \in FEAS_6$. The right column of Table 2 presents the optimal cost as computed by DPE-CONDIS. Consider the first row in Table 2 with state (0, 0, 0). Then, the set of feasible states at nodes 12, 11 and 10 includes only a single value, $FEAS_{12}(x_6=(0, 0, 0))=FEAS_{11}(x_6=(0, 0, 0))=\{(0, 1, 1)\}$, and $FEAS_{10}(x_6=(0, 0, 0))=\{(0, 1, 0)\}$. This is so since program 1 is not needed at these nodes and programs 2 and 3 are not broadcast into these nodes. As another example, consider the fifth row with state $x_6=(0, 1, 1)$. The sets of feasible states at nodes 12, 11 and 10 are $FEAS_{12}(x_6=(0, 1, 1))=FEAS_{11}(x_6=(0, 1, 1))=\{(0, 1, 1), (0, 1, 2), (0, 2, 1), (0, 2, 2)\}$ and $FEAS_{10}(x_6=(0, 1, 1))=\{(0, 1, 0), (0, 2, 0)\}$. The optimal solution for tree $T_6$ with state $x_6=(0, 1, 1)$ is 25. Solution for all other nodes and states are derived in the same way.

TABLE 2

Computation of Costs for Node 6

| $FEAS_6$ | $V_6(x_6)$ |
|---|---|
| (0, 0, 0) | 0 + $V_{12}$(0, 1, 1) + $V_{11}$(0, 1, 1) + $V_{10}$(0, 1, 0) = 0 + 10 + 10 + 8 = 28 |
| (0, 0, 1) | 8 + $V_{12}$(0, 1, 1) + $V_{11}$(0, 1, 1) + $V_{10}$(0, 1, 0) = 8 + 10 + 10 + 8 = 36 |
| (0, 0, 2) | 4 + $V_{12}$(0, 1, 1) + $V_{11}$(0, 1, 1) + $V_{10}$(0, 1, 0) = 4 + 10 + 10 + 8 = 32 |
| (0, 1, 0) | 8 + $V_{12}$(0, 1, 1) + $V_{11}$(0, 1, 1) + $V_{10}$(0, 2, 0) = 8 + 10 + 10 + 3 = 31 |
| (0, 1, 1) | 10 + $V_{12}$(0, 2, 2) + $V_{11}$(0, 2, 2) + $V_{10}$(0, 2, 0) = 10 + 6 + 6 + 3 = 25 |
| (0, 1, 2) | 12 + $V_{12}$(0, 2, 2) + $V_{11}$(0, 2, 2) + $V_{10}$(0, 2, 0) = 12 + 6 + 6 + 3 = 27 |
| (0, 2, 0) | 4 + $V_{12}$(0, 1, 1) + $V_{11}$(0, 1, 1) + $V_{10}$(0, 2, 0) = 4 + 10 + 10 + 3 = 27 |
| (0, 2, 1) | 12 + $V_{12}$(0, 2, 2) + $V_{11}$(0, 2, 2) + $V_{10}$(0, 2, 0) = 12 + 6 + 6 + 3 = 27 |
| (0, 2, 2) | 8 + $V_{12}$(0, 2, 2) + $V_{11}$(0, 2, 2) + $V_{10}$(0, 2, 0) = 8 + 6 + 6 + 3 = 23 |

The optimal solution for this example is $V_0(1, 1, 1)=72$. The optimal state at each node is obtained through standard backtracking. The results are: $x^*_0=(1, 1, 1)$; $x^*_1(x^*_0)=(1, 0, 1)$; $x_2^*(x_0^*)=(0, 2, 0)$; $x_3^*(x_1^*)=(2, 0, 0)$; $x_4^*(x_2^*)=(0, 2, 0)$; $x^*_5(x_1^*)=(2, 0, 2)$; $x_6^*(x_2^*)=(0, 1, 1)$; $x_7^*(x_5)=(2, 0, 2)$; $x_8^*(x_5^*)=(2, 0, 2)$; $x^*_9(x_5^*)=(2, 0, 0)$; $x_{10}(x_6^*)=(0, 2, 0)$; $x^*_{11}(x_6^*)=(0, 2, 2)$; and $x_{12}(x_6^*)=(0, 2, 2)$.

The optimal values of the state variables at the network nodes readily imply optimal server installation and program assigning decisions. Specifically, $z^*_0=z^*_1=z^*_6=$ and all other $z^*_j=0$; and $y^*_{01}=y^*_{02}=y^*_{03}=y^*_{11}=y^*_{13}=y^*_{62}=y^*_{63}=1$ and all other $y^*_{jp}=0$. Thus, servers are installed in nodes 0, 1 and 6, and programs 1, 2 and 3 are assigned to the server at node 0, programs 1 and 3 are assigned to the server at node 1, and programs 2 and 3 are assigned to the server at node 6.

All other decision variables in the CONDIS Model can be uniquely determined form the $y^*_{jp}$'s as the cost parameters $c_{lp}>0$ imply that program p at node n should be served by a server at node $j \in QN(0, n)$ that is the closest server to n and that has program p. Hence, $u^*_{042}=u^*_{131}=U^*_{171}=u^*_{173}=u^*_{181}=u^*_{183}=u^*_{191}=u^*_{6,10,2}=u^*_{6,11,2}=u^*_{6,11,3}=u^*_{6,12,2}=u^*_{6,12,3}=1$ and all other $u^*_{unp}=0$. These variables, in turn, determine the $v^*_{lp}$ values used to compute the cost of bandwidth on the network links. Specifically, $v^*_{22}=v^*_{42}=v^*_{31}=v^*_{51}=v^*_{53}=v^*_{71}=v^*_{73}=v^*_{81}=v^*_{83}=v^*_{91}=v^*_{10,2}=v^*_{11,2}=v^*_{11,3}=v^*_{12,2}=v^*_{12,3}=1$, and all other $v^*_{lp}=0$. This completes the specification of the solution.

Consider the case where the cost of storing program p at the central server at node 0 for routing purposes only to other servers is $s1_{0p}=1$, and the cost of broadcasting program p from node 0 to satisfy demand at other nodes is $s2_{0p}=1$ for $p=1, 2, 3$. State variable $x_{0p}=0$ is used to represent storing program p at node 0 for routing purposes only (at a cost of $s1_{0p}=1$), and $x_{0p}=1$ is used to represent storing program p at node 0 for routing and broadcasting purposes (at a cost of $s1_{0p}+s2_{0p}=2$). DPM-CONDIS can readily be adapted to find the optimal decision at node 0. In our example, the results are: $V_0(0, 0, 0)=72$, $V_0(0, 0, 1)=73$, $V_0(0, 1, 0)=70$, $V_0(0, 1, 1)=71$, $V_0(1, 0, 0)=73$, $V_0(1, 0, 1)=74$, $V_0(1, 1, 0)=71$, and $V_0(1, 1, 1)=72$. The optimal solution is $V_0(0, 1, 0)=70$. Note that the optimal decisions are the same as in the former example where $x_0=(1, 1, 1)$ is enforced. The server at node 0 broadcasts only program 2 to node 4, while all other broadcasting is done from servers at nodes 1 and 6. The optimal cost is now 70, instead of 72, as the cost of assigning programs 1 and 3 at node 0 without broadcasting capabilities reduces the cost by 2.

While there has been described and illustrated a method of optimizing content distribution in video-on-demand tree networks, it will be apparent to those skilled in the art that modifications and variations are possible without deviating from the broad teachings of the present invention which shall be limited solely by the scope of the claims appended hereto.

What is claimed is:

1. A method for planning optimal locations of a plurality of servers in a video-on-demand network of a tree topology and optimal assignment of a plurality of programs to each of the servers for requested demands at each node, comprising:

minimizing a sum of costs of installed servers, costs of assigned programs, and costs of link bandwidths required to broadcast the programs over links of the network while satisfying the demands for a plurality of programs at a plurality of nodes as specified by a CON-DIS model for the requested demands time invariant set of demands using dynamic programming optimization method specified by DPM-CONDIS to determine optimal locations of the plurality of servers and optimal assignment of the plurality of programs at each of the servers where said method uses dynamic programming equations specified by DPE-CONDIS.

2. The method as set forth in claim 1, wherein said dynamic programming equations specified by DPE-CONDIS further comprises using multiple state variables at each of the nodes of the network tree topology, one state variable for each program, wherein each state variable assumes a maximum of three values specifying whether the program is assigned to the node, the program is not assigned to the node but is broadcast into the node, and the program is not assigned to the node and not broadcast into the node.

3. The method as set forth in claim 2, wherein said method further comprises computing the cost at each node as a function of the state variable values at each node.

4. A dynamic programming method for planning optimal locations of a plurality of servers at nodes in a video-on-demand network of a tree topology and optimal assignment of a plurality of programs to each of the servers for requested demands at each node a time invariant set of demands comprising:

providing a solution to a CONDIS Model using dynamic programming method specified by DPM-CONDIS for the of requested demands and wherein said method uses dynamic programming equations specified by DPE-CONDIS, wherein the solution: minimizes a sum of costs of installed servers, costs of assigned programs, and costs of link bandwidths required to broadcast the programs over a plurality of links throughout the network; and, satisfying requests for a plurality of programs at a plurality of nodes.

5. A dynamic programming method for planning optimal content distribution in a video-on-demand network of a tree topology wherein optimal content distribution comprises optimal locations of a plurality of servers and optimal assignment of a plurality of programs to each of the servers for requested demands a time invariant set of demands wherein said solution minimizes a sum of costs of installed servers, costs of assigned programs, and costs of link bandwidths required to broadcast the programs over a plurality of links throughout the network while satisfying demands for a plurality of programs at plurality of nodes wherein the method is specified by DPM-CONDIS where the dynamic programming equations in said method are specified by DPE-CONDIS, providing optimal solution to CONDIS Model for the requested demands.

6. A system for planning optimal locations of a plurality of servers in a video-on-demand network of a tree topology and optimal assignment of a plurality of programs to each of the servers for requested demands invariant set of demands as specified by a CONDIS model, comprising:

means for minimizing a sum of costs of installed servers, costs of assigned programs, and costs of link bandwidths required to broadcast the programs over links of the network;

means for satisfying all the demands for a plurality of programs at a plurality of nodes; and, means for using dynamic programming optimization method specified by DPM-CONDIS to determine optimal locations of the plurality of servers and optimal assignment of the plurality of programs at each of the servers where said optimization method uses dynamic programming equations specified by DPE-CONDIS for the requested demands.

7. The system as set forth in claim 6 further comprising means using multiple state variables at each of the nodes of the network tree topology, one state variable for each program, wherein each state variable assumes a maximum of three values specifying whether the program is assigned to the node, the program is not assigned to the node but is broadcast into the node, and the program is not assigned to the node and not broadcast into the node.

8. The system as set forth in claim 7, further comprising means computing the cost at each node as a function of the state variable values at each node.

9. A dynamic programming optimization system for planning optimal locations of a plurality of servers at nodes in a video-on-demand network of a tree topology and optimal assignment of a plurality of programs to each of the servers, comprising:
    means for providing a solution to a CONDIS Model for of demands requested demands at each node using dynamic programming method specified by DPM-CONDIS where said method uses dynamic programming equations specified by DPE-CONDIS including:
    means for minimizing a sum of costs of installed servers, costs of assigned programs, and costs of link bandwidths required to broadcast the programs throughout the network; and,
    means for satisfying all requests for a plurality of programs at a plurality of nodes.

10. A dynamic programming optimization system for planning optimal content distribution in a video-on-demand network of a tree topology wherein optimal content distribution comprises optimal locations of a plurality of servers and optimal assignment of a plurality of programs to each of the servers for a requested set of demands, comprising:
    means for minimizing the total cost of a plurality of servers installed at nodes of a network of a tree topology, plus a sum of costs of installed servers, costs of assigned programs, and costs of link bandwidths required to broadcast the programs over a plurality of links throughout the network;
    means for satisfying demands for a plurality of programs at a plurality of nodes; and,
    means for using dynamic programming method specified by DPM-CONDIS where said method uses dynamic programming equations specified by DPE-CONDIS, providing optimal solution to a CONDIS Model for the requested demands.

\* \* \* \* \*